United States Patent

Santschi et al.

[11] Patent Number: 5,837,017
[45] Date of Patent: Nov. 17, 1998

[54] APPARATUS FOR CLEANING BAGHOUSE FILTERS

[75] Inventors: Mark Santschi, Lee's Summit; Gregg Zoltek, Kansas City, both of Mo.

[73] Assignee: BHA Group Holdings, Inc., Kansas City, Mo.

[21] Appl. No.: 643,206

[22] Filed: May 2, 1996

[51] Int. Cl.⁶ .......................... B01D 29/17; B01D 29/66
[52] U.S. Cl. .............................. 55/302; 55/341.1; 95/20; 95/280
[58] Field of Search ................................ 55/302, 341.1, 55/361, 341.6, 341.2; 95/19, 279, 280, 20

[56] References Cited

U.S. PATENT DOCUMENTS

| | | | |
|---|---|---|---|
| 3,360,907 | 1/1968 | Clark, Jr. et al. | 55/283 |
| 4,174,204 | 11/1979 | Chase | 55/302 X |
| 4,786,293 | 11/1988 | Labadie | 55/272 X |
| 5,094,675 | 3/1992 | Pitt et al. | 55/302 X |
| 5,242,472 | 9/1993 | Sellakumar | 55/302 X |
| 5,395,409 | 3/1995 | Klimczak et al. | 55/302 |
| 5,439,494 | 8/1995 | Tullis et al. | 95/279 X |

FOREIGN PATENT DOCUMENTS 61-141911  6/1986  Japan .

*Primary Examiner*—Richard L. Chiesa
*Attorney, Agent, or Firm*—Shook, Hardy & Bacon L.L.P.

[57] ABSTRACT

A method and apparatus for cleaning baghouse filters includes a baghouse having an upper, clean air chamber and a lower, dirty air chamber. Particulate-laden air is introduced into the dirty air chamber, particulates are collected onto filters suspended within the dirty air chamber, and the clean air exits outwardly up through open tops of the filters into the clean air chamber. A compressed air supply, a pressure regulator, a controller, a transducer, and a gauge are provided. Piping supplies compressed air from the supply to a header located at the baghouse, where the compressed air can be distributed to a selected row of filters for the purpose of cleaning the filters in the row. The transducer receives static pressures of air from the clean and dirty air chambers, respectively, and generates an electrical signal indicative of the differential air pressure between each of the chambers. This electrical signal is transmitted to the controller, which utilizes the signal to adjust the regulator so that the compressed air used for cleaning the filters is proportional to the pressure differential between the clean and dirty air chambers of the baghouse.

9 Claims, 1 Drawing Sheet

APPARATUS FOR CLEANING BAGHOUSE FILTERS

BACKGROUND OF THE INVENTION

1. Field of the Invention

The present invention is directed to a method and apparatus for cleaning filter bags or filter cartridges, in a baghouse, using compressed air. Particularly, the present invention is directed to a pulse-jet cleaning device and method for a baghouse including a proportional pressure regulator for regulating the pressure of the cleaning air.

2. Description of the Related Art

Baghouses for filtering particulate-laden air are well-known. Conventional baghouses have a large housing with an upper, clean air chamber; and lower, dirty air chamber. The two chambers are separated by a sheet of metal, known as a tube sheet, having a number of openings therein. Filter bags or cartridges are aligned in each of the openings in the tube sheet and suspend downwardly from the tube sheet into the dirty air chamber. Particulate-laden air is introduced into the dirty air chamber, whereupon the particulates collect onto the filter bags or cartridges. The filtered air passes through the filtering media to the interior of the filter bag or cartridge, and upwardly out through the openings in the tube sheet and into the clean air chamber. From the clean air chamber, the cleaned air is exhausted into the environment, or recirculated for other uses.

During a continuous filtering operation, particulate cakes onto the filtering media, thus reducing the airflow through the filters. As a result, the filter elements must be frequently cleaned. One desirable, known method for cleaning filter media in a baghouse uses pressurized air. This type of cleaning, commonly called pulse-jet cleaning, forces compressed air downwardly into the filters in a direction that is reverse to the normal flow of air, to thereby dislodge the particulates that have caked onto the filter media. In operation, these blasts of pressurized air cause the filter media, which are typically positioned on a cage or a perforated sleeve, to initially expand from the cage or sleeve, thereby fracturing the particulate layer on the filter media. The pressurized air also forces the particulate to dislodge from the filter media. The dislodged particulate is typically collected in a hopper at a lower end of the baghouse. Upon completion of the pulse-jet air cleaning process, the filter media contracts back to its normal position on the cage or sleeve.

As will be readily appreciated, if there is too much particulate collected on a filter, airflow through the filter is diminished. It is, however, important to have a certain amount of particulate on the filter media to maintain maximum filtering efficiency. Thus, filtering efficiency in a baghouse depends upon an optimum layer of dust being present on the filtering media.

Prior art pulse-jet cleaning systems utilize compressed air at a constant pressure for dislodging the particulate from the filter media. One known method for employing a pulse-jet cleaning system is to periodically activate the system at a constant air pressure. The time period between activations of the system is typically selected based upon the calculated need for cleaning. Stated differently, for each row of bags or filter cartridges within a baghouse, there is a selected time interval between, or frequency of, pulse-jet cleaning. Thus, as one row of filter bags or cartridges is pulse-cleaned, a preset timer is activated at a selected amount of time such that, at the duration of the selected time, the pulse-jet cleaning system is again activated at the constant pulsing pressure to clean the row of filters.

Another known method for activating a pulse-jet cleaning system utilizes the differential pressure across the filter media within the baghouse. As particulate builds up on the filter media, the more difficult it is to force air through the particulate layer and, thus, the higher the resulting differential pressure across the filtering media. Prior art systems have been constructed to monitor this differential pressure across the filter media, and to activate the pulse-jet cleaning system when the differential pressure reaches a selected upper threshold level. Once the pulse-jet cleaning system is initially activated, the subsequent activations of the pulse-jet cleaning system are separated by a selected period of time, until the differential pressure across the filter media reaches a selected lower threshold level. As will be understood, the lower threshold level is typically set so as to maintain a certain minimum amount of particulate layer on the bag, so as to maintain optimum filtering efficiency.

A primary drawback of the foregoing prior art pulse-jet cleaning techniques is that they utilize constant air pressure for cleaning. The use of constant air pressure tends to decrease the wear life of the filter media and often uses excess energy. In this regard, each time the pulse-jet cleaning device is activated, the filter media is flexed outwardly and, upon completion of the filtering cycle, flexes inwardly to its normal position. The greater the pulse pressure that is utilized, the more radical the flexing of the filter media, and the more wear experienced by the filter media. Prior art pulse-jet cleaning systems utilizing constant air pressure, even where that air pressure is greater than needed to effectively clean the filtering media, place excess stress upon the filtering media. Additionally, such systems often utilize more energy than is needed to accomplish the cleaning task, and therefore are inefficient.

Accordingly, the need exists for a pulse-jet baghouse cleaning device and method which utilize compressed air at a pressure which is proportional to the amount of particulate caked onto the filter media. Additionally, the need exists for a baghouse pulse-jet cleaning system which is energy efficient, and which increases the wear life of the filter media. The present Invention overcomes the drawbacks of the prior art, and fills these and other needs.

SUMMARY OF THE INVENTION

It is an object of the present invention to clean filter media in a baghouse in an energy efficient manner.

It is an object of the present invention to pulse-jet clean filter media in a baghouse in a manner which increases the wear life of the filter media.

It is an additional object of the present invention to provide a device and method for pulse-jet cleaning filter media within a baghouse, which device and method utilize compressed air, for cleaning baghouse filter media, at a pressure that is proportional to the particulate layer on the filter media.

It is a specific object of the present invention to control the pressure of compressed air, used for cleaning baghouse filters, based upon the air pressure differential between the clean and dirty air chambers of a baghouse.

These and other objects are achieved by an apparatus, method, and system for cleaning filter media in a baghouse dust collector. Specifically, the present invention includes a baghouse having a lower chamber into which particulate-laden air is introduced. Thus, the lower chamber is known as the dirty air chamber or plenum. The baghouse also has an upper, clean air chamber. The upper and lower chambers are separated by a tube sheer having rows of apertures therein.

A plurality of cylindrical filters are suspended from the sheet, and thus hang downwardly into the dirty air chamber. Each filter is suspended from the sheet in alignment with one of the apertures in the sheet. As will be understood, the filters may be oriented in the baghouse chamber in other manners, such as horizontally. As particulate-laden air is introduced into the dirty air chamber, the particulate is collected by the filters. The air travels inwardly to the interior of the cylindrical filters, and upwardly out through the apertures in the sheet, and into the upper chamber. For this reason, the upper chamber is known as a clean air chamber or plenum. The cleaned air is exhausted to the atmosphere or is recirculated for other uses.

In accordance with a principal aspect of the present invention, a system for cleaning the filters has a supply of compressed air, a pressure regulator, a controller, and a transducer. The compressed air supply is connected by piping to an elongated header located at the baghouse. The piping supplies compressed air from the compressed air supply to the header, where it can be distributed to a selected row of filters for the purpose of cleaning the filters in the row. The header has a plurality of cleaning conduits coupled to it, each cleaning conduit positioned in the clean air chamber of the baghouse and aligned over one of the rows of filters. A series of valves are provided on the header for selectively controlling distribution of compressed air to the cleaning conduits. As will be readily understood, compressed air is introduced into the header and, upon opening a selected one of the valves, the compressed air is released into the cleaning conduit associated with the opened valve. Each cleaning conduit has a plurality of openings in its bottom surface. Each opening is in vertical alignment with one of the filters. Thus, the compressed air released into a cleaning conduit is forced downwardly through the openings in the cleaning conduit, through the apertures in the tube sheet separating the chambers of the baghouse, and downwardly into the center of the filters of the row being cleaned. The compressed air causes the filter to expand, thereby fracturing the particulate caked onto the filter. Additionally, the compressed air blows a quantity of the particulate from the filter, and into a collection hopper located at the bottom of the baghouse.

A first tube is connected from the clean air chamber of the baghouse to the transducer. A second tube is connected from the dirty air chamber of the baghouse to the transducer. In this way, the static pressure of clean air is transmitted through the first tube to the transducer, and the static pressure of dirty air is transmitted from the dirty air chamber to the transducer. It will be understood that, in normal operation of the baghouse, the air pressure in the upper clean air chamber is different than the air pressure in the lower, dirty air chamber. Moreover, the pressure differential between the two chambers varies during the continuous operation of the baghouse. Specifically, in normal baghouse operation, as an increasing amount of particulate is collected on the filters, the differential pressure between the two air chambers increases. The transducer receives the static pressure of air from the clean and dirty air chambers, respectively, and generates and outputs an electrical signal indicative of the differential air pressure between each of the chambers. This electrical signal is transmitted through a wire pair to the controller. Upon receiving the electrical signal indicative of the air pressure differential between each of the chambers, the controller adjusts the pressure regulator accordingly. Specifically, the controller adjusts the pressure regulator to regulate the pressure of the compressed air provided to the baghouse for cleaning, so that the compressed air is proportional to the pressure differential between the clean and dirty air chambers. In this way, when the filters are cleaned by releasing the compressed air downwardly into the filters, the air pressure of the compressed air corresponds with the pressure needed to adequately clean the filters, without excessively expanding the filter.

The initial settings for the cleaning system of the present invention are a matter of design choice. In this regard, the performance of the particular baghouse is monitored, and the regulator is calibrated to supply a determined air pressure corresponding to a selected pressure differential between the clean and dirty air chambers. As the actual pressure differential varies, the controller proportionally adjusts the regulator to thereby proportionally vary the pressure of the compressed air used for cleaning the filters.

Activation of the pulse-jet cleaning system of the present invention may be carried out in one of various known manners. As described, conventional pulse-jet cleaning systems periodically clean each row of filters in a baghouse by opening the appropriate valve on the header Thus, a system for controlling the valves is coupled to the valves. As described above, prior art techniques for cleaning a row of filters include periodically cleaning the row upon each lapse of a selected duration of time. In some instances, the row of filters is initially cleaned when the pressure differential across the filter bags reaches an upper threshold limit, whereupon a selected row of filters is initially cleaned, and then subsequently cleaned upon each lapse of a selected duration of time, until the pressure differential across the filter bags reaches a selected lower threshold limit. The present invention may be utilized in conjunction with either type of system for activating cleaning. In this regard, it will be appreciated that, in accordance with the principles of the present invention and in contrast to prior art systems, the air pressure of the compressed air utilized for cleaning corresponds to the amount of particulate caked onto the filters and, particularly, is proportional to the pressure differential between the clean air chamber and the dirty air chamber

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
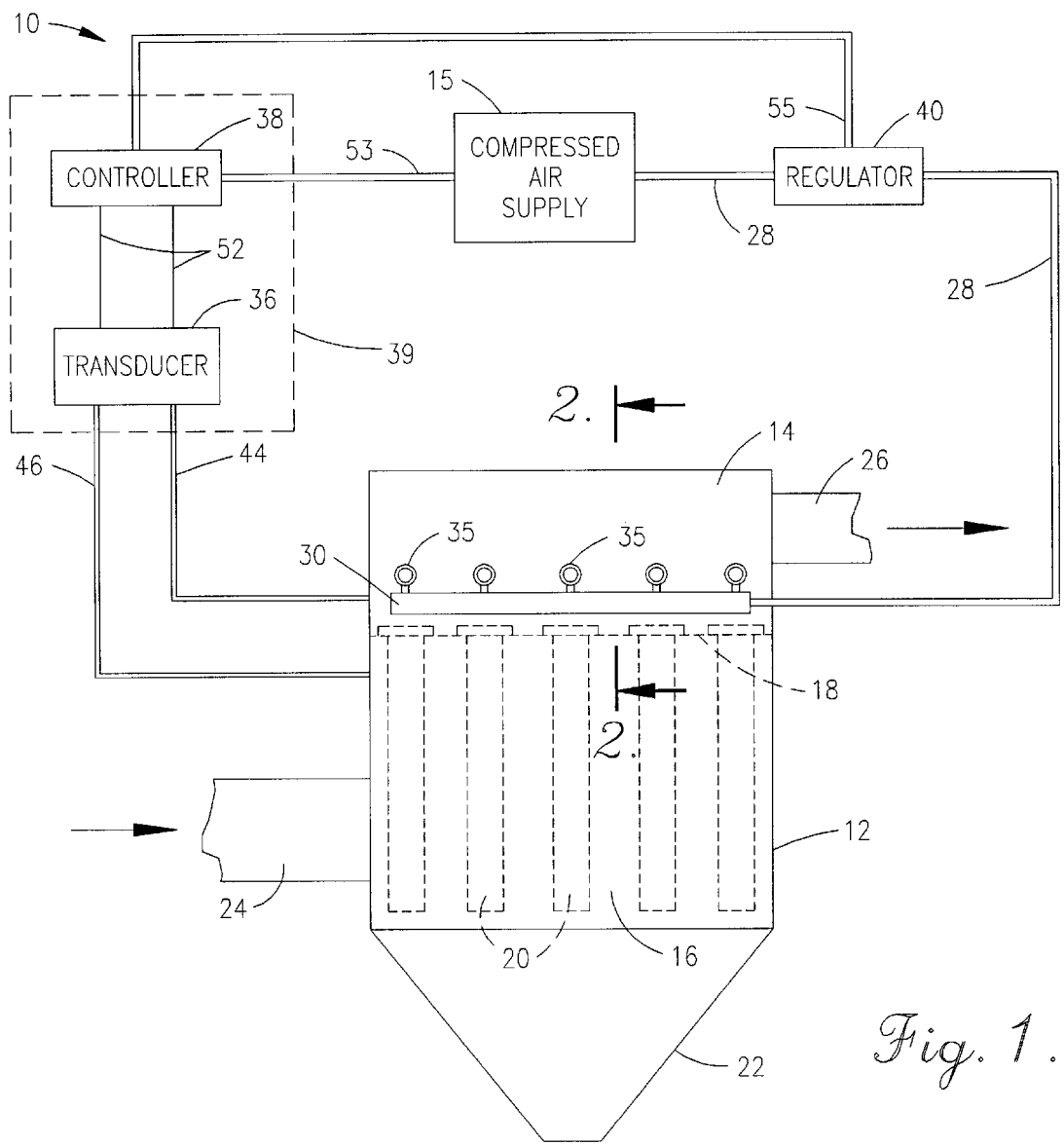
FIG. 1 is a schematic view of the baghouse cleaning system of the present invention.

With reference to FIG. 1, the pulse-jet baghouse cleaning system of the present invention is denoted generally by the reference numeral 10. The overall system 10 includes a baghouse 12, having a clean air chamber 14 and a dirty air chamber 16 separated by a tube sheet 18. Tube sheet 18 is a piece of sheet metal having rows of apertures therein, as will be readily understood by those skilled in the art. A plurality of filter elements 20 are connected in the tube sheet 18 in any conventional manner. Filter elements 20 are preferably comprised of a filter bag placed about a cage, but may also comprise a filter cartridge of the type having pleated filter media placed about a perforated sleeve. Baghouse 12 has a hopper 22 at its lower end. A dirty air inlet 24 is in communication with dirty air chamber 16, and a clean air outlet 26 provides an outlet from clean air chamber 14.

Figure 2:
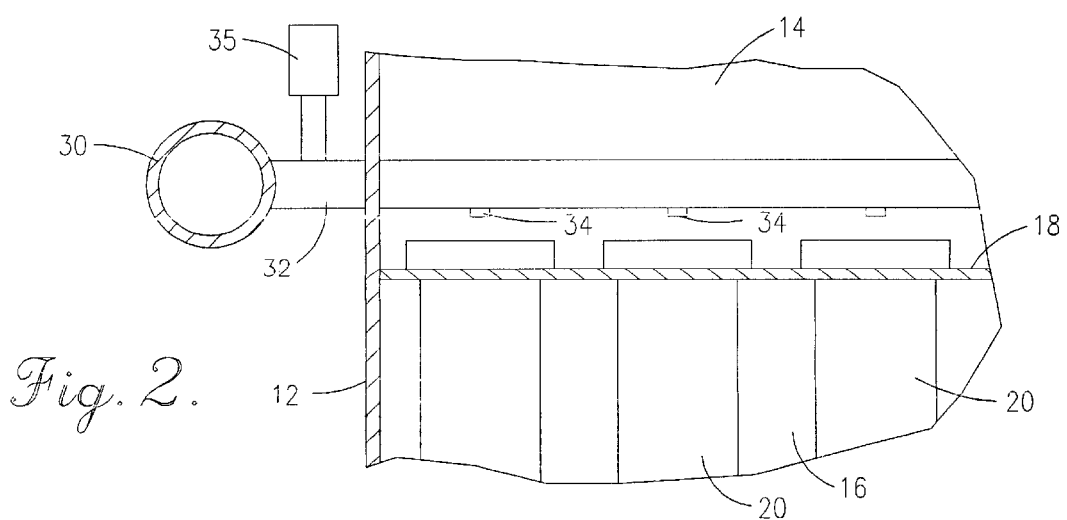
FIG. 2 is a cross-sectional view taken along line 2—2 of FIG. 1.

The system 10 has a compressed air supply 15, for providing a compressed air supply. A compressed air supply line, consisting of tubing 28, supplies compressed air into a header 30, positioned at one side of the baghouse 12. Header 30 consists of an elongated pipe. Tubing 28 enters into a first end of the header 30, while the opposite end of header 30 is closed. It should be understood that tubing 28 can be of various types, including piping. As illustrated in FIG. 2, and as will be understood, a plurality of cleaning conduits 32, commonly known as blowpipes, extend from header 30. Each cleaning conduit 32 is positioned over a row of filter elements 20. Each cleaning conduit 32 has a plurality of openings (or nozzles) 34 spaced along a lower side thereof. Each opening 34 is in vertical alignment with one of the filter elements 20 in the row of filter elements 20 over which the cleaning conduit 32 is positioned. Header 30 has a plurality of valves 35 positioned thereon. Each valve 35 is associated with one of the cleaning conduits 32. In this way, compressed air provided through tubing 28 into header 30 may be released into a selected one of the cleaning conduits 32 by opening the appropriate valve 35. Opening and closing of the valves 35 may be accomplished in any conventional manner, such as by a system for periodically opening and closing each valve 35, or by such a system including a means for determining the preferential pressure across the filters, and initially opening the valve when the pressure differential reaches an upper threshold level. Variations in the manner of activating the cleaning system of the present invention are contemplated.

It will be understood that the present invention may also be employed with a plenum pulse style of pulse-jet cleaning system, such as those made by Fuller. In a plenum pulse-jet cleaning system, an entire baghouse compartment has only one associated valve, such that opening the valve cleans the filters in the entire compartment. Thus, FIG. 2 is also representative of such a system wherein valve 35 is a single valve and that which is identified as cleaning conduit 32 is an element for conducting compressed air to an entire baghouse compartment.

System 10 further includes a transducer 36, a controller 38, a pressure regulator 40, and a gauge 42. In a preferred embodiment, transducer 36 and controller 38 are housed in a common housing, indicated by dashed box 39. A first conduit 44 connects clean air chamber 14 with transducer 36. A second conduit 46 connects dirty air chamber 16 with transducer 36. In this way, the first conduit 44 provides a static pressure measurement of clean air from clean air chamber 14 to transducer 36, while the second conduit 46 provides a static pressure measurement of dirty air from dirty air chamber 16 to transducer 36. Transducer 36 receives each static pressure, and generates an electrical signal indicative of the pressure differential between the first and second chambers 14, 16 of the baghouse 12. Transducer 36 has an output 48 connected by wire pair 52 to controller 38. The electrical signal indicative of the air pressure in clean air chamber 14 is output from output 48 of transducer 36 and transmitted along wire pair 52 to controller 38.

In operation, particulate-laden air is introduced into dirty air chamber 16 of baghouse 12 through dirty air inlet 24. The dirty air is cleaned by filter elements 20 as the particulates collect on the filters 20, resulting in clean air exiting into the clean air chamber 14. When a particular row of filter elements 20 is to be cleaned, the valve 35 corresponding with that row of filter elements 20 is opened, thus releasing compressed air from header 30 into the cleaning conduit 32 corresponding with the row of filter elements to be cleaned. In accordance with a principal aspect of the present invention, the air pressure of the compressed air is proportional to the pressure differential between the dirty air chamber 16 and clean air chamber 14. In this regard, first and second tubes 44, 46 provide the static pressure of clean and dirty air, respectively, to transducer 36. As described, transducer 36 receives the respective pressures of air, and generates an electrical signal indicative of the air pressure differential between each of the chambers 14, 16. The generated electrical signal is transmitted via wire pair 52 to controller 38. Controller 38 receives the electrical signal indicative of the air pressure differential between the upper and lower chambers 14, 16. In response to the determined pressure differential, controller 38 proportionally adjusts pressure regulator 40 to thereby proportionally adjust the pressure of the compressed air supplied to baghouse 12.

Specifically, in operation, the differential air pressure between clean air chamber 14 and dirty air chamber 16 will typically be between zero and fifteen inches water column, where 27.7 inches water column equals 1 psi. As will be readily understood by those with skill in the art, as particulates collect onto filter elements 20, the pressure differential between clean and dirty air chambers 14, 16 of baghouse 12 increases.

The transducer 36 receives pneumatic signals in the form of air pressure from each of the upper and lower chambers, and determines the differential air pressure between the two chambers. The preferred transducer is commonly available such as pressure transducers supplied by Dwyer or Mamac. The differential air pressure is converted to an electrical signal by the transducer 36, and the electrical signal proportional to the differential air pressure is output to the controller 38. The electrical signal indicative of the determined air pressure differential is typically between 4 and 20 milliamps. The controller 38 is preferably of a type, such as manufactured by Mac Valves as Model No. PPCSA, which converts the electrical signal into a pneumatic signal proportional to the electrical signal. In this regard, controller 38 has a compressed air line 53 (from reservoir) feeding into it. As will be understood, controller 38 uses the compressed air in its conversion of the electrical signal to a pneumatic signal. The pneumatic signal from the controller 38 is sent, via conduit 55, to the in-line pressure regulator 40 for adjusting the regulator to supply compressed air through tubing 28 to the baghouse 12 at an air pressure that is proportional to the pressure differential between the chambers 14, 16 of the baghouse 12. The preferred pressure regulator 40 is a commonly available component, such as pressure regulators supplied by Watts.

It will be understood that the present invention could be constructed in a variety of manners. For instance, a transducer of a different type could be utilized which converts the pneumatic air pressure signals received from upper and lower chambers 14, 16 into first and second electrical signals, and then sends both electrical signals to a controller, whereupon the controller determines the differential between the first and second electrical signals, and generates and outputs an electrical signal proportional to the pressure differential between the two chambers. In such an embodiment, the pressure regulator would be electrically controllable such that the electrical signal would adjust the regulator to provide a correspondingly proportional air pressure to the baghouse.

A method of cleaning filters in a baghouse, in accordance with the principles of the present invention, will be readily clear in view of the foregoing, and is briefly described. The present method of cleaning filters in a baghouse 12 having a clean air chamber 14 and a dirty air chamber 16 includes the steps of determining the pressure differential between the clean and dirty air chambers 14, 16 of the baghouse 12. Determining the air pressure includes continuously monitoring the air pressure in the clean air chamber 14, continuously monitoring the air pressure in the dirty air chamber 16, and generating an electrical signal indicative of the air pressure differential between the chambers of the baghouse. The step of supplying compressed air for cleaning filter elements 22 in a baghouse 12 includes receiving the generated electrical signal indicative of the air pressure differential between the baghouse chambers 14, 16, and proportionally adjusting the air pressure supplied.

The described apparatus, system, and method for cleaning baghouse filters enhance operating efficiency of a baghouse, conserve energy, and extend the wear life of baghouse filters.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An apparatus for cleaning filters in a baghouse, said baghouse having a dirty air chamber in which said filters are positioned and a clean air chamber, said apparatus comprising:
   a supply of compressed air;
   a controller for controlling the pressure of said compressed air; and
   a conduit for conducting said compressed air at a controlled pressure to said baghouse for application to said filters for cleaning thereof, wherein said controller varies the pressure of said compressed air that is applied to said filters in substantially direct proportion to a pressure differential between said dirty air chamber and said clean air chamber.

2. The apparatus as set forth in claim 1 further comprising a pressure regulator, connected to said controller, for regulating the pressure of said compressed air, wherein said controller controls said pressure regulator in response to changes in said pressure differential between said dirty air chamber and said c lean air chamber.

3. The apparatus as set forth in claim 1 further comprising a transducer for receiving a first static pressure of air from said clean air chamber and for receiving a second static pressure of air from said dirty air chamber, said transducer outputting to said controller a signal indicative of the pressure differential between said clean air chamber and said dirty air chamber.

4. The apparatus as set forth in claim 3 wherein said controller receives said signal indicative of said pressure differential and responsively controls said regulator in a manner to supply said compressed air to said baghouse at a pressure that is proportional to the pressure differential between said clean air and said dirty air chambers of said baghouse.

5. The apparatus as set forth in claim 1, said baghouse having rows of filters positioned therein, said apparatus further comprising:

a header;
a plurality of cleaning conduits extending from said header, each said cleaning conduit corresponding to one of said rows of filters, and each said cleaning conduit having a plurality of openings along a lower surface thereof, each said opening aligned with one of said filters; and
a plurality of valves, each said valve coupled to one of said cleaning conduits, wherein opening a said valve releases compressed air into its respective cleaning conduit, and wherein said released compressed air exits said cleaning conduit through said openings, to thereby clean said filters in the row of filters corresponding to said opened valve.

6. A system for cleaning filters in a baghouse, said baghouse having a clean air chamber and a dirty air chamber separated by a sheet having rows of apertures therein, and a plurality of filters attached to said sheet, each said filter aligned with one of said apertures, said cleaning system comprising:
   means for supplying compressed air to at least one row of said filters to thereby clean said filters in said row; and
   a controller for controlling the pressure of said compressed air in response to a pressure differential between said dirty air chamber and said clean air chamber, wherein said system supplies said compressed air to said baghouse, for cleaning said filters, at a pressure that is proportional to the differential in pressure between said clean air chamber and said dirty air chamber.

7. A system comprising:
   a baghouse having an upper clean air chamber and a lower dirty air chamber, said chambers separated by a sheet having rows of apertures therein;
   a plurality of filters attached to said sheet, each said filter in alignment with one of said apertures, wherein particulate-laden air is introduced into said dirty air chamber, and said filters collect said particulates, thereby resulting in filtered air exiting into said clean air chamber through said apertures in said sheet, whereby normal operation of said baghouse causes the differential pressure between said clean air chamber and said dirty air chamber to fluctuate;
   a line for supplying compressed air to said baghouse;
   a pressure regulator for regulating the pressure of said compressed air in said line; and
   a controller, coupled to said regulator, for controlling said regulator in response to said differential pressure between said clean air chamber and said dirty air chamber, said differential pressure being indicative of particulate layer thickness to thereby control the pressure of said compressed air in said line in substantially direct proportion to said pressure differential.

8. The system as set forth in claim 7, further comprising a transducer for receiving a first static pressure of air from said clean air chamber and for receiving a second static pressure of air from said dirty air chamber, said transducer outputting to said controller a signal indicative of the pressure differential between said clean air chamber and said dirty air chamber.

9. The system as set forth in claim 7 wherein said controller receives said signal indicative of said pressure differential between said dirty air chamber and said clean air chamber, and controls said regulator based upon said signal.

* * * * *